United States Patent
Holierhoek

[11] Patent Number: 6,070,445
[45] Date of Patent: Jun. 6, 2000

[54] METHOD OF MANUFACTURING THE CONTROL ARM

[75] Inventor: Michael Holierhoek, St. Catharines, Canada

[73] Assignee: TRW Inc., Lyndhurst, Ohio

[21] Appl. No.: 08/960,378

[22] Filed: Oct. 29, 1997

[51] Int. Cl.[7] .................................................. B21D 22/00
[52] U.S. Cl. ............................ 72/61; 72/55; 29/897.2; 29/421.1
[58] Field of Search ................................. 72/55, 56, 61; 29/897.2, 421.1

[56] References Cited

U.S. PATENT DOCUMENTS

| | | |
|---|---|---|
| 3,144,259 | 8/1964 | Haan . |
| 4,170,373 | 10/1979 | Beck et al. . |
| 4,567,743 | 2/1986 | Cudini . |
| 4,744,237 | 5/1988 | Cudini . |
| 4,822,073 | 4/1989 | Tanahashi et al. ............ 280/660 |
| 4,964,651 | 10/1990 | Kubo . |
| 5,070,717 | 12/1991 | Boyd et al. . |
| 5,163,603 | 11/1992 | Richart . |
| 5,338,057 | 8/1994 | Dickerson et al. . |
| 5,362,090 | 11/1994 | Takeuchi ..................... 280/660 |
| 5,431,326 | 7/1995 | Ni et al. . |
| 5,435,205 | 7/1995 | Seksaria et al. . |
| 5,471,857 | 12/1995 | Dickerson . |
| 5,557,961 | 9/1996 | Ni et al. . |
| 5,564,785 | 10/1996 | Schultz et al. . |
| 5,641,176 | 6/1997 | Alatalo . |
| 5,662,349 | 9/1997 | Hasshi et al. ................ 29/897.2 |
| 5,673,929 | 10/1997 | Alatalo . |
| 5,799,524 | 9/1998 | Schafer et al. . |

FOREIGN PATENT DOCUMENTS

| | | |
|---|---|---|
| 0742057 | 1/1996 | European Pat. Off. . |
| 0758565 | 8/1996 | European Pat. Off. . |
| 4322632 | 1/1995 | Germany . |
| 05220534 | 8/1993 | Japan . |
| 5220534 | 8/1993 | Japan . |
| 7315025 | 12/1995 | Japan . |
| 911722 | 1/1997 | Japan . |
| 2291382 | 1/1996 | United Kingdom . |

OTHER PUBLICATIONS

"*Automotive Suspension and Steering Systems*", Thomas W. Birch, Chpt. 8, pp. 182–193.

*Chilton's Automotive Industries* article entitled "Hydro-Forming is Hot", Christopher A. Sawyer, pp. 49–51, Jun. 1991.

*Primary Examiner*—David Jones
*Attorney, Agent, or Firm*—Tarolli, Sundheim, Covell. Tummino & Szabo L.L.P.

[57] ABSTRACT

A vehicle suspension control arm (10) is formed as a single, homogeneous unit of metal material in the configuration of an elongated tube (30). The tube (30) has first and second pairs of opposed openings (68, 68; 80, 80) defining first and second passages (72, 82) which are sized to receive first and second pivotal joint structures (20, 22), respectively. The first and second passages (72, 82) extend transversely through first and second hydroformed sections (40, 42) of the tube (30).

4 Claims, 3 Drawing Sheets

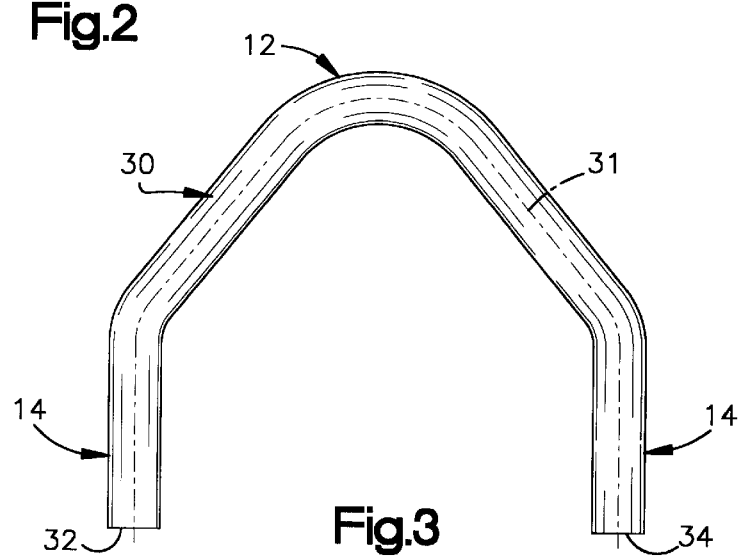
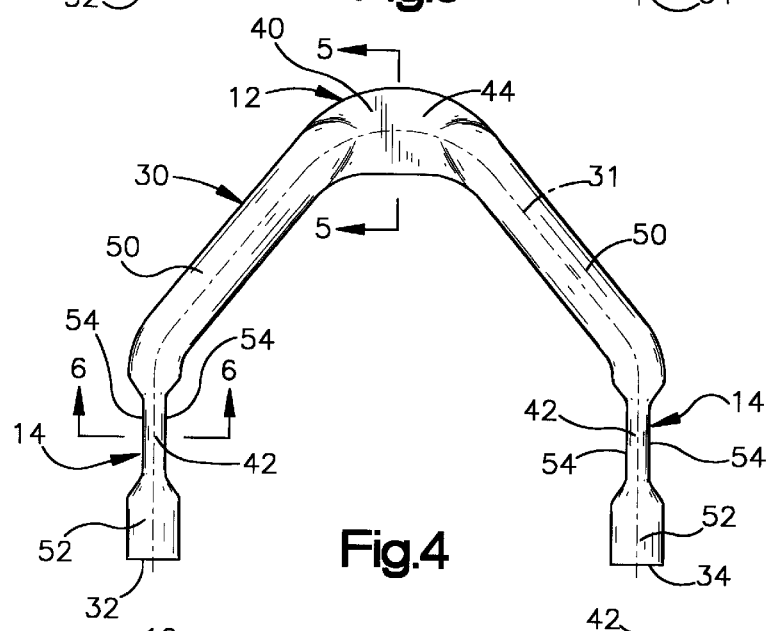
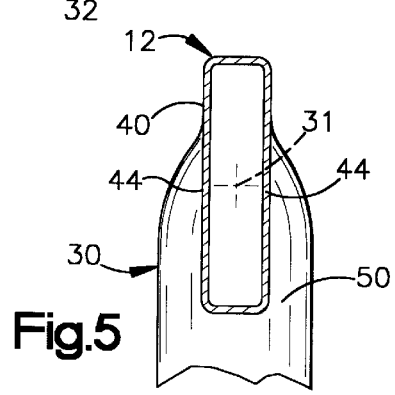
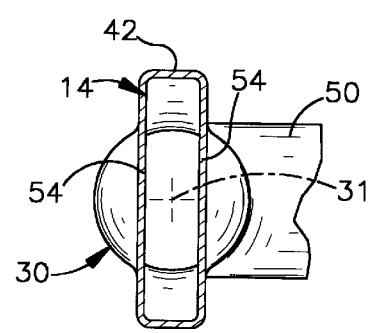

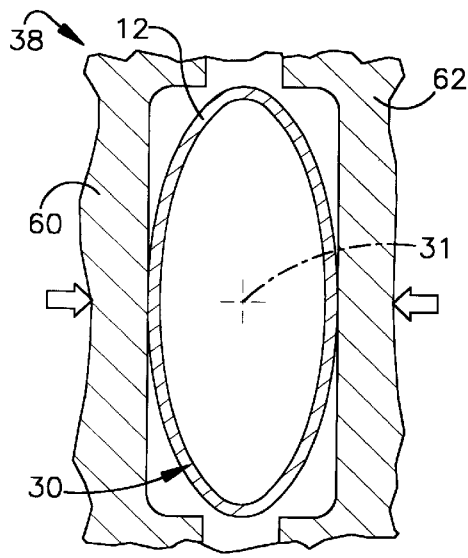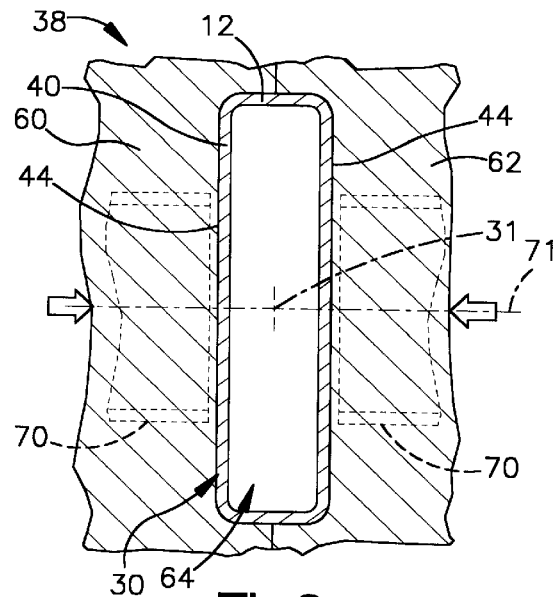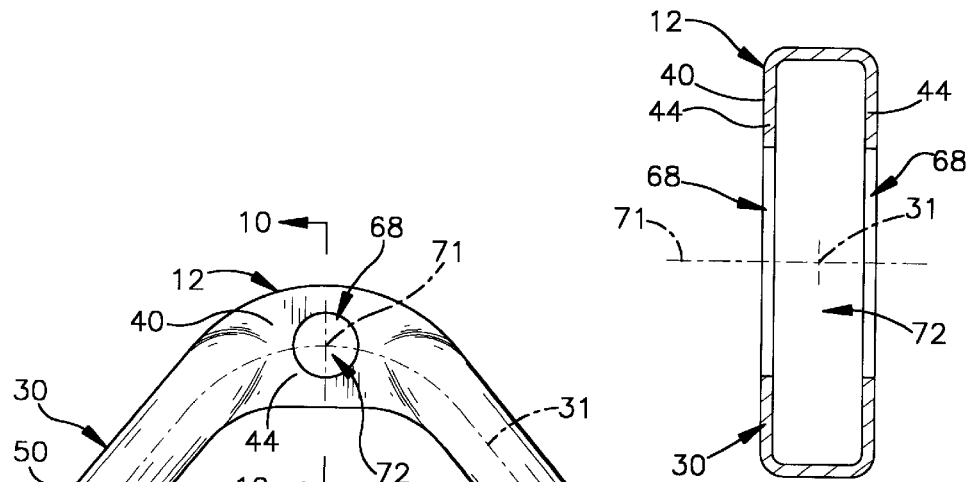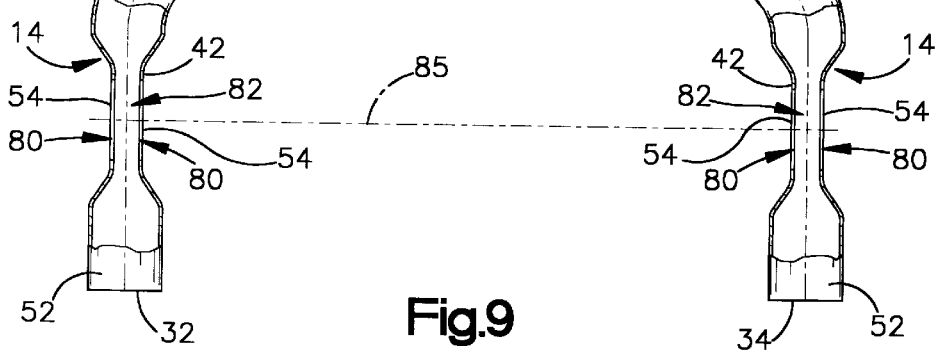

6,070,445

METHOD OF MANUFACTURING THE CONTROL ARM

FIELD OF THE INVENTION

The present invention relates to a control arm for a vehicle suspension, and particularly relates to a method of manufacturing the control arm by use of a hydroforming process.

BACKGROUND OF THE INVENTION

A vehicle suspension includes a plurality of parts that connect the vehicle wheels to the vehicle frame. For example, a steerable vehicle wheel is connected to the frame by parts including a control arm and a steering knuckle. The steering knuckle is fixed to the wheel. The control arm has an outer end which is pivotally connected to the steering knuckle. The control arm further has one or two inner ends, each of which is pivotally connected to the vehicle frame. In this arrangement, the control arm helps to support the wheel for vertical movement relative to the frame, and simultaneously blocks horizontal movement of the wheel relative to the frame.

SUMMARY OF THE INVENTION

In accordance with the present invention, a vehicle suspension control arm comprises a single, homogeneous unit of metal material in the configuration of an elongated tube. The tube has first and second pairs of opposed openings defining first and second passages which are sized to receive first and second pivotal joint structures, respectively. The first and second passages extend transversely through first and second hydroformed sections of the tube.

In a preferred embodiment of the present invention, the control arm is an A-arm having an outer end portion and a pair of inner end portions. The first passage extends through the outer end portion of the A-arm. The second passage is one of a pair of second passages extending through the inner end portions of the A-arm.

BRIEF DESCRIPTION OF THE DRAWINGS

The foregoing and other features of the present invention will become apparent to one skilled in the art upon reading the following description with reference to the accompanying drawings wherein:

FIGS. 2–4 show successive configurations taken by a tube upon manufacturing the control arm of FIG. 1;

FIG. 5 is a view taken on line 5—5 of FIG. 4;

FIG. 6 is a view taken on line 6—6 of FIG. 4;

FIGS. 7 and 8 are schematic views showing successive steps taken in a hydroforming press upon manufacturing the control arm of FIG. 1;

FIG. 9 shows another successive configuration taken by the tube of FIGS. 2–4;

FIG. 10 is a view taken on line 10—10 of FIG. 9; and

DESCRIPTION OF A PREFERRED EMBODIMENT OF THE INVENTION

Figure 1:
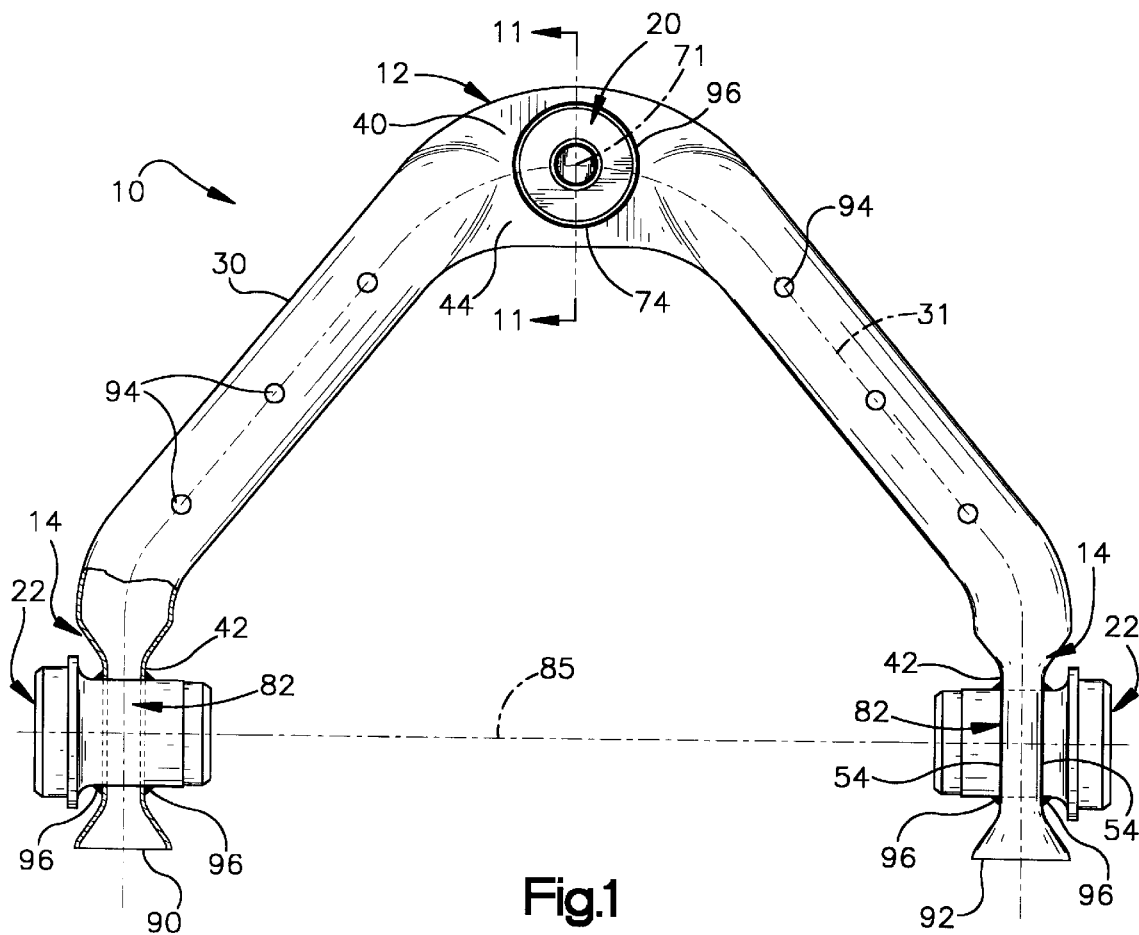
FIG. 1 is a view, taken from beneath, of a control arm comprising a preferred embodiment of the present invention.

A control arm 10 comprising a preferred embodiment of the present invention is shown in FIG. 1. The control arm 10 is an A-arm with an outer end portion 12 at the apex of the A shape and a pair of inner end portions 14 at the ends of the legs of the A shape. The outer end portion 12 of the control arm 10 supports a first pivotal joint structure 20 which connects the control arm 10 to a steering knuckle (not shown) in a vehicle steering linkage. The first pivotal joint structure 20 in the illustrated embodiment of the present invention is a ball joint. The inner end portions 14 of the control arm 10 support a pair of second pivotal joint structures 22 which connect the control arm 10 to a vehicle part (not shown) such as a frame or a reinforced body part. The second pivotal joint structures 22 in the illustrated embodiment are pivot bushings.

The control arm 10 in the preferred embodiment of the present invention is a one-piece structure. By "one-piece" it is meant that the control arm 10 is a single, homogeneous unit of material which does not include separate but joined pieces. In accordance with this feature of the invention, the control arm 10 is manufactured by shaping an elongated metal tube 30 in the successive configurations shown in FIGS. 2–10. As shown in FIG. 2, the tube 30 is a single, homogeneous unit of metal material which has a straight, cylindrical configuration with a longitudinal central axis 31 and a predetermined length between its opposite terminal ends 32 and 34. The tube 30 may be constructed in any suitable tube-forming process known in the art, such as extruding or rolling, and may be formed of any suitable metal material known in the art, such as steel or aluminum. However, the tube 30 in the preferred embodiment of the present invention is formed of rolled steel.

The straight tube 30 of FIG. 2 is bent into the configuration in which it is shown in FIG. 3. This provides the tube 30 with the A-arm configuration in which it has the outer end portion 12 and the pair of inner end portions 14. Preferably, the diameter and length of the tube 30 are substantially unaffected by the bending step. The bent tube 30 of FIG. 3 thus has a circular cross-sectional shape which is centered on a longitudinal centerline 31 uniformly along its length between the opposite terminal ends 32 and 34. This also may be performed in any suitable manner known in the art.

In a subsequent step, the bent tube 30 of FIG. 3 is provided with the configuration in which it is shown in FIG. 4. This is preferably done in a hydroforming press 38, as described below with reference to FIGS. 7 and 8, but could be done in a press external to the hydroforming press 38. The tube 30 then has a first flattened section 40 and a pair of second flattened sections 42. The first flattened section 40 is located at the outer end portion 12 of the tube 30, and has a substantially rectangular cross-sectional shape (FIG. 5) with pair of flat, parallel opposite side walls 44. The second and third flattened sections 42 are located at the inner end portions 14 of the tube 30. Specifically, the second flattened sections 42 are equally spaced from the first flattened section 40 by a pair of elongated cylindrical sections 50 of the tube 30, and are spaced equal distances from the opposite terminal ends 32 and 34 by a pair of short cylindrical sections 52. The second flattened sections 42 are alike, and each has a substantially rectangular cross-sectional shape (FIG. 6) with a pair of flat, parallel opposite side walls 54.

The first flattened section 40 of the tube 30 is formed in steps including a preforming step (FIG. 7) and a final hydroforming step (FIG. 8). In the preforming step, the outer end portion 12 of the tube 30 is partially flattened between a pair of opposed dies 60 and 62 in the hydroforming press 38. In the final hydroforming step, the tube 30 is filled with hydraulic fluid, and the outer end portion 12 is further deformed under the influence of internal hydraulic fluid pressure as well as external loading between the dies 60 and 62. This causes the outer end portion 12 to take the peripheral shape of a substantially rectangular cavity 64 defined by and between the dies 60 and 62. In this manner, the first flattened section 40 of the tube 30 is formed at the outer end portion 12. The second flattened sections 42 at the inner end portions 14 of the tube 30 are preferably formed in die cavities in the hydroforming press 38 in the same manner.

Each side wall 44 of the first flattened section 40 is provided with an opening 68 (FIGS. 9 and 10). This is preferably accomplished by the use of a pair of opposed punching dies 70 in the hydroforming press 38, as shown schematically in FIG. 8. The punching dies 70, as well as the other parts of the hydroforming press 38, may be constructed and operated in any suitable manner known in the art.

Figure 11:
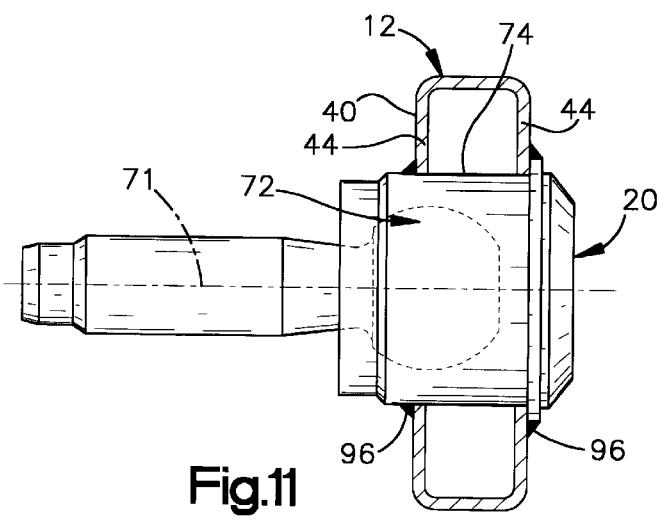
FIG. 11 is a view taken on line 11—11 of FIG. 1.

The openings 68 in the preferred embodiment of the present invention are circular openings with equal diameters, and are centered on a common axis 71 perpendicular to the centerline 31 of the tube 30. In this configuration, the openings 68 are opposed to each other across the first flattened section 40 of the tube 30 so as to define a passage 72 extending transversely through the tube 30. The diameter of the openings 68 is just slightly less than the diameter of a cylindrical housing portion 74 of the ball joint 20, as shown in FIG. 11, so that the housing 74 is receivable within the passage 72 in an interference fit.

The side walls 54 at the second flattened sections 42 of the tube 30 are similarly provided with opposed pairs of circular openings 80 (FIG. 9) that define corresponding passages 82 extending transversely through the tube 30. The passages 82 at the second flattened sections 42 are centered on a common axis 85 which is perpendicular to the axis 71 at the first flattened section 40, and are sized to receive the bushings 22 in interference fits, as shown in FIG. 1.

Next, the short cylindrical sections 52 are cut from the tube 30 to define the finished length of the control arm 10 (FIG. 1). In accordance with an optional feature of the present invention, the newly formed terminal ends 90 and 92 of the tube 30 are left open. At least one drainage hole is formed in the tube 30 to drain environmental water that could enter the tube 30 through the open ends 90 and 92. In the preferred embodiment of the invention, a plurality of drainage holes 94 are formed in rows at the elongated cylindrical sections 50 of the tube 30, as shown in FIG. 1. The ball joint 20 and the pivot bushings 22 are then installed in the passages 72 and 82, respectively, in interference fits, and may be further secured in place by welds 96.

From the above description of the invention, those skilled in the art will perceive improvements, changes and modifications. Such improvements, changes and modifications within the skill of the art are intended to be covered by the appended claims.

Having described the invention, the following is claimed:

1. A method comprising the steps of:
deforming a cylindrical metal tube to provide the tube with a plurality of partially flattened sections;
hydroforming said tube to provide each of said partially flattened sections with a pair of parallel opposite side walls;
forming a plurality of passages extending transversely through said tube by providing each pair of said side walls with a pair of opposed openings defining a corresponding one of said passages;
said passages including a first passage which is sized to receive a first pivotal joint structure that connects said tube pivotally to a vehicle part;
said passages further including a second passage which is sized to receive a second pivotal joint structure that connects said tube pivotally to another vehicle part; and bending said tube into the configuration of an A-arm prior to said deforming step, said A-arm having an outer end portion and a pair of inner end portions, said first passage being formed at said outer end portion of said A-arm said second passage being one of a pair of second passages formed at said inner end portions of said A-arm.

2. A method comprising the steps of:
deforming a cylindrical metal tube to provide the tube with a plurality of partially flattened sections;
hydroforming said tube to provide each of said partially flattened sections with a pair of parallel opposite side walls;
forming a plurality of passages extending transversely through said tube by providing each pair of said side walls with a pair of opposed openings defining a corresponding one of said passages;
said passages including a first passage which is sized to receive a first pivotal joint structure that connects said tube pivotally to a vehicle part;
said passages further including a second passage which is sized to receive a second pivotal joint structure that connects said tube pivotally to another vehicle part; and
forming at least one drainage hole in said tube.

3. A method comprising the steps of:
deforming a cylindrical metal tube to provide the tube with a plurality of partially flattened sections;
hydroforming said tube to provide each of said partially flattened sections with a pair of parallel opposite side walls;
forming a plurality of passages extending transversely through said tube by providing each pair of said side walls with a pair of opposed openings defining a corresponding one of said passages;
said passages including a first passage which is sized to receive a first pivotal joint structure that connects said tube pivotally to a vehicle part;
said passages further including a second passage which is sized to receive a second pivotal joint structure that connects said tube pivotally to another vehicle part; and
forming said tube as a single homogeneous unit of metal material.

4. A method comprising the steps of:
deforming a cylindrical metal tube to provide the tube with at least three partially flattened sections;
hydroforming said tube to provide each of said partially flattened sections with a pair of parallel opposite side walls;
forming a plurality of passages extending transversely through said tube by providing each pair of said side walls with a pair of opposed openings defining a corresponding one of said passages;
said passages including a first passage which is sized to receive a first pivotal joint structure that connects said tube pivotally to a first vehicle portion;
said passages further including a second passage which is sized to receive a second pivotal joint structure that connects said tube pivotally to a second vehicle portion;
said passages also including a third passage which is sized to receive a third pivotal joint structure that connects aid tube pivotally to a third vehicle portion.

* * * * *